(12) United States Patent
Barrow et al.

(10) Patent No.: US 11,657,730 B2
(45) Date of Patent: May 23, 2023

(54) SIMULATOR FOR MANUAL TASKS

(71) Applicant: Generic Robotics Limited, Warwickshire (GB)

(72) Inventors: Alastair Barrow, Middlesex (GB); Thomas Smith, Berkshire (GB)

(73) Assignee: GENERIC ROBOTICS LIMITED, Warwickshire (GB)

( * ) Notice: Subject to any disclaimer, the term of this patent is extended or adjusted under 35 U.S.C. 154(b) by 575 days.

(21) Appl. No.: 16/341,023

(22) PCT Filed: Oct. 10, 2017

(86) PCT No.: PCT/IB2017/056258
§ 371 (c)(1),
(2) Date: Apr. 10, 2019

(87) PCT Pub. No.: WO2018/069834
PCT Pub. Date: Apr. 19, 2018

(65) Prior Publication Data
US 2019/0236974 A1   Aug. 1, 2019

(30) Foreign Application Priority Data

Oct. 10, 2016   (GB) ..................................... 1617166
Oct. 10, 2016   (GB) ..................................... 1617167

(51) Int. Cl.
*G09B 19/24*   (2006.01)
*G09B 19/00*   (2006.01)
*G09B 9/00*    (2006.01)

(52) U.S. Cl.
CPC ............. *G09B 19/003* (2013.01); *G09B 9/00* (2013.01); *G09B 19/24* (2013.01)

(58) Field of Classification Search
CPC ...... G09B 19/003; G09B 19/24; G09B 23/28; G09B 23/30
See application file for complete search history.

(56) References Cited

U.S. PATENT DOCUMENTS

2007/0270685 A1* 11/2007 Kang ..................... A61B 90/03
                                                        600/424
2010/0086905 A1   4/2010 Alejandro et al.
2011/0091846 A1   4/2011 Kreindl et al.
(Continued)

FOREIGN PATENT DOCUMENTS

CN      101344997 A      1/2009
WO   WO2007/091008      8/2007
(Continued)

OTHER PUBLICATIONS

PCT International Search Report and Written Opinion, PCT/IB2017/056258, dated Jan. 19, 2018.
(Continued)

*Primary Examiner* — Kurt Fernstrom
(74) *Attorney, Agent, or Firm* — William H. Bollman

(57) ABSTRACT

A simulator for manual tasks comprising a first robot arm, a second robot arm and a controller. The first robot arm has a connector (730) at a distal end for connecting to a tool (762) and the second robot arm having a connector (740) at a distal end for connecting to the tool. The controller is operable to simulate at least two different procedures in response to the attachment of different tools to the robot arms.

20 Claims, 6 Drawing Sheets

(56) References Cited

U.S. PATENT DOCUMENTS

| | | | |
|---|---|---|---|
| 2011/0097696 A1 | 4/2011 | Potti Cuervo et al. | |
| 2013/0189663 A1* | 7/2013 | Tuchschmid | G09B 23/28 |
| | | | 434/262 |
| 2014/0057236 A1* | 2/2014 | Meglan | G09B 23/30 |
| | | | 434/268 |
| 2014/0088941 A1 | 3/2014 | Banerjee et al. | |
| 2014/0276950 A1* | 9/2014 | Smaby | A61B 34/30 |
| | | | 606/130 |
| 2016/0210882 A1* | 7/2016 | Gulasy | A61B 34/10 |
| 2016/0354169 A1* | 12/2016 | Suttin | A61B 34/20 |

FOREIGN PATENT DOCUMENTS

| | | |
|---|---|---|
| WO | WO2016/015560 | 2/2016 |
| WO | WO2017/098036 | 6/2017 |

OTHER PUBLICATIONS

UK Combined Search and Examination Report, GB 1617166.2, dated Jul. 20, 2017.

* cited by examiner

SIMULATOR FOR MANUAL TASKS

FIELD OF THE INVENTION

The present invention relates to a simulator for use in the field of simulating manual tasks, particularly for training for, assessing, planning, or rehearsing intricate manual tasks such as procedures on the human or animal body.

BACKGROUND TO THE INVENTION

Simulators for clinical professionals exist to allow them to gain a high level of manual dexterity and coordination prior to operating on an actual patient. While these are typically used by trainees, they can also be used by more experienced personnel for continuing professional development (CPD) or even, using actual data from a patient, to rehearse a forthcoming procedure. However, the existing simulators suffer from a number of drawbacks, predominantly inflexibility. Thus, a single device is provided for a single medical procedure, such as arthroscopy or dental drilling, which is in high demand when trainees are studying the relevant topic and may lie idle while other topics are studied. This results either in poor provision of simulators or a large amount of (often expensive) equipment which is seldom used.

It is an object of the first aspect of the present invention to provide a training simulator that ameliorates this inflexibility.

PRIOR ART

WO 2017/098036 A1 (FUNDACIO INSTITUT RECERCA DE L'HOSPITAL DE LA SANTA CREU I SANT PAU) discloses a simulator for training users in performing endoscopic operations. The simulator comprises a casing and a removable model of a biological organ, a processor and a manual input means with haptic feedback.

US 2011/091846 A1 (KRIENDL ET AL.) discloses a device for simulating a welding process. The simulator includes a computer with a display linked to a manual input device and a removably attachable workpiece.

STATEMENT OF THE INVENTION

According to a first aspect of the present invention there is provided a simulator comprising: a first robot arm, a second robot arm and a controller, the first robot arm having a connector at a distal end for interchangeably connecting to a plurality of tools, the second robot arm having a connector at a distal end for interchangeably connecting to the plurality of tools, characterised in that each of the connectors comprise tool identifying means for identifying which of the plurality of tools has been connected to them, at least one of the plurality tools is configured to be connected either the connector of the first robot arm or the connector of the second robot arm, and . . . whereby the controller is operable to simulate at least two different procedures in response to the attachment of different tools to the robot arms.

In use, a user is able to manipulate a tool attached to one or both of the first and second robot arms by the connectors, so as to simulate a procedure which may be associated with the tool. The controller may detect movement of, reorientation of, and/or forces applied to the robot arms and may thereby detect manipulation of the tool.

The controller may actuate the robot arms to apply haptic feedback (such as a resistive force) to the tool in response to the manipulation of the tool by a user.

Tools for connecting to the connectors may be configured to be connected to one of the connectors in use, may be configured to be connected to either of the connectors in use, and/or may be configured to be connected to both of the connectors in use.

Tools for use with the simulator may be actual tools for using in the procedure that is being simulated. These tools may have been modified to enable them to be connected to the connectors at the distal ends of the robot arms. Alternatively, the tools may be imitation tools for use with a simulator, such as bespoke tools for practice or training.

The tools for use with the simulator may each comprise one or more connecting elements for connecting to the connectors at the distal ends of the robot arms. For example, the connectors comprised by the robot arms may be, or may comprise, female connectors and the tools may each comprise one or more associated male connectors.

While simulating a procedure, one or more tools may be connected to simulator. When a single tool is used, it may be connected to one or both of the connectors at the distal ends of the first and second robot arms. When two tools are used, separate tools may be connected to each of the connectors. Connecting a single tool to multiple robot arms (preferably at different points on the tool) may allow the orientation of a tool to be detected in addition to the position of the point at which it is connected. Connecting multiple separate tools may allow the simulator to be used to simulate processes using multiple discrete tools or implements.

In embodiments of the simulator comprising more than two robot arms with connectors, any number of tools be used, and each tool may be able to connected to any number of connectors.

The distal ends of the robot arms may be distal from a base or support structure upon comprised by the simulator, upon which the robot arms are supported, may be distal from the controller, and/or may be distal from one or more actuators or motors which manipulate or apply force to the robot arms.

The controller is operable to simulate at least two different procedures in response to the attachment of different tools to the robot arms. The system comprises tool identifying means for identifying which of a plurality of tools and/or tool types has been attached to the connectors at the distal ends of the robot arms. These means are comprised by the connectors at the distal ends of the robot arms.

The tool identifying means may comprise analogue detecting elements, for example, the means may detect different tools by differently shaped connecting elements comprised by different tools. Alternatively, or additionally, the tool identifying means may comprise electronic or digital detecting means, for example, the connectors at the distal ends of the robot arms, and the connecting elements comprised by the tool may comprise associated electrical connectors for completing an electrical connection between the tool and the robot arm and/or the controller.

The controller may automatically begin or prepare to simulate a specific procedure when an associated tool is connected to one or more of the connectors at the distal ends of the robot arms.

One or more procedures may be associated with a single tool or tool type. The tools and/or the simulator may comprise control means with which a user may be able to switch between multiple procedures associated with a tool. One or more tools may have different associated procedures depending upon the manner in which it is connected to the robot arms, for example a tool may simulate a different procedure if it is connected to two robot arms than if it is connected to a single robot arm.

One, some or all of the tools for use with the simulator may comprise one or more additional electrical components, such as sensors (for example, an accelerometer, one or more pressure sensors or an inertial measurement unit), lights, haptic feedback means (such as a vibrating means) and/or one or more memory units.

These electrical components may be in electrical communication with the controller (optionally, only when the tool by which they are comprised is connected to one or more of the robot arms). The electrical signals may provide signals to and/or may be controlled by the controller with which they are in electrical communication. The communication between the controller and the one or more tools may be wireless, for example, the communication may be via a short range radio frequency (RF) communication protocol (such as Bluetooth®) and/or may be via a pathway of one or more electrical conductors, for example which extend from the controller, along the length of the robot arms and through an electrical connection made between the connector and the tool.

The simulator may comprise one or more wireless transceivers for communicating with tools and/or may comprise pathways of electrical conductors from the controller to each of the connectors which may be adapted to make electrical connection with suitable tools.

One, some or all of the tools for use with the simulator may comprise a memory unit which may be configured to store parameters and/or programs which may be used by the controller when it communicates with the tool (for example, via one of the electrical connectors) to simulate a procedure associated with the tool. In some embodiments the behaviour of controller, as it simulates a procedure, may be determined by data, parameters or programs stored in the memory unit.

Optionally, all or some of the digital information necessary for the controller to simulate a procedure may be stored on a memory unit which may be comprised by a tool or connected thereto when required. Alternatively, the memory unit may contain information indicative of which of a plurality of procedures preprogramed into the controller is to be used.

Tools (including imitation or simulated tools) may include drills (such as dentists' drills), syringes, dental explorers, blades, scissors, staplers, pliers, or other tools. Tools may also be, or may comprise means for tracking the movement of a user's hands or elements thereof, such as "thimbles", which fit over a user's finger tips, gloves or other tracking means attachable to a user's hands. This may allow the simulator to track the movement of a user's fingers or hands.

The connectors and/or connecting elements comprised by the tools are preferably releasable connectors. One some or all of the connectors may comprise magnetic connectors, bayonet mounts, BNC connectors, plugs, sockets, and/or threaded portions.

Alternatively, or additionally, one, some or all of the connectors may comprise electrical connectors which may transmit power and/or data between the simulator and any tool connected to the connectors.

This arrangement provides further flexibility since it permits the re-arrangement of the kinematics of the robot arms. Typically, arrangements with interchangeable tools provide a coupling for the tool that is connected to all of the relevant robot arms. Thus, the kinematic arrangement is the same regardless of the tool fitted. However, in the present arrangement, different tools can be associated with different performance (in terms of torque, applied force, etc) of the haptic arrangement.

Preferably, the tool is fitted using magnetic couplings as disclosed in our application (UK Patent Application GB1617167.0) filed on the same date as the application from which the present application claims priority, of as disclosed in the International Patent Application claiming priority therefrom.

In some embodiments, the tool may be provided with an electronic key that permits the control circuitry to automatically sense which tool is fitted. This information can then be fed to the control algorithm to allow for the consequent changes to the kinematic arrangement.

The controller may be informed by the user (for instance via a user interface) which tool or tools are attached or, preferably, the connector on one or more of the robot arms may be arranged to automatically sense which tool is attached. This could be done using a binary number coded into the tool by means of conducting/non-conducting links on a connector that attaches to the robot arm(s).

The simulator may comprise a third robot arm with a connector at a distal end for connecting to a tool. The simulator may further comprise a fourth robot with a connector at a distal end for connecting to a tool. In further embodiments the simulator may comprise more than four robot arms with connectors at their distal ends for connecting tools.

In embodiments comprising three or more robot arms, tools for connecting to the connectors at the distal ends of the robot arms may be configured to be connected to one, two, three, four, some, and/or all of the connectors in use. A tool may be configured to be connected to a specific connector, to a specific subset of connectors, to any one of a specific subset of connectors, and/or to any of a plurality of subsets of a specific subset of connectors.

In use, one or more tools may be connected to the connectors. For example, in an embodiment comprising four robot arms with connectors, two tools may be connected to two connectors each, or a single tool may be connected to all four connectors.

Connecting a tool to three, four, or more connectors may allow its arrangement and/or movement in three-dimensional space to be more precisely detected by the controller. For example, in an embodiment where three different robot arms are connected to different points on a rigid body comprised by a tool (the points not being arranged in a straight line) the movement of the body in all six degrees of freedom of the rigid body in three-dimensional space may be detected by the controller.

In some embodiments, different connectors may be connected to different portions of the tool which are displaceable with respect to each other, for example a first connector may be connected to the barrel of a syringe tool, and a second connector may be connected to the piston or plunger of the syringe tool. This may allow the depression of the piston or plunger to be detected by the controller. In some such embodiments, an additional connector may be connected to such a syringe to allow rotation or the syringe around its central longitudinal axis to be detected.

One, some, or all of the robot arms may be controlled using an impedance control method, for example wherein in response to displacement of the robot arm the controller applies resistive forces to the robot arm dependent upon the movement of the robot arm. Alternatively, or additionally, one, some or all of the robot arms may use an admittance control method wherein when a force is exerted upon the robot arm; the robot arm is displaced by the controller in a manner dependent upon the force applied.

According to a second aspect of the invention there is provided a simulator, comprising: a body comprising a first part and a removable second part; one or more physical feedback means; one or more manual engaging means, connected to at least one of the one or more physical feedback means, and movable by the user in free space; sensing means arranged to sense inputs to the manual engaging means; and processing means connected to a display, to the sensing means, and to the physical feedback means, for providing feedback to the user in response to inputs via the manual engaging means, wherein the first part of the body is provided with a physical and electrical connector for engaging the second part and the physical and electrical connector includes connections for sensing means and connectors for physical feedback means.

The first part of the body comprises the physical and electrical connector for engaging with the second part of the body, and may further comprise a stand or base upon which the simulator may be supported, wheels or castors for facilitating transportation of the simulator, a housing for containing other components of the simulator, a work surface upon which a user may conduct a simulated procedure, a power supply, a displaceable or removable cover, one or more mirrors, control means for controlling the simulator and/or input means for reprogramming the simulator and/or the processing means.

The first part of the body may comprise the processing means, the sensing means, the display and/or may comprise one, some, or all of the one or more physical feedback means and/or manual engaging means.

The first part of the body may be adjustable, for example so as to adjust the height of the physical and electrical connector and/or the height at which the procedure will be simulated.

The first part of the body will typically include a stand or housing, a power supply and the processor (together with memory, disc drive, optical drive and keyboard as appropriate).

The second removable part of the body is typically cartridge or module which connects to the simulator using the physical and electrical connector. A plurality of different interchangeable modules or cartridges (second removable body parts) may be usable with and connectable to the first part of the body. Different second body parts may be used to simulate different procedures and or to simulate different body parts for the simulation of medical or dental procedures.

In some embodiments, the removable second part of the body, or some of a plurality of such second body parts, may comprise one or more sensing means and/or one or more feedback means. The physical and electrical connector for engaging removable second body parts includes connections for sensing means and for physical feedback means.

These may be electrical connections which allow electrical components of the first body part to provide power to and/or to communicate with sensing means and/or physical feedback means comprised by a second body part when a second body part which is connected to the first body part comprises suitable sensing means and/or physical feedback means.

In some embodiments, sensing means which are comprised by the removable second body part may be the, or some of the sensing means comprised by the simulator which are arranged to sense inputs to the manual engaging means. Alternatively, all of the sensing means arranged to sense inputs to the manual engaging means may be comprised by the first body part and the sensing means comprised by the removable second body part or parts may be additional sensing means.

Additional sensing means comprised by removable second body parts may for example, comprise pressure sensors (such as to detect where on a removable second body part a user is leaning)

Embodiments where some or all of the sensing means arranged to sense inputs to the manual engaging means are comprised by the first body part may allow removable second body parts without sensing means to be interchanged with those with sensing means in use.

In some embodiments, physical feedback means which are comprised by the removable second body part may be the, or some of the physical feedback means comprised by the simulator to which the manual engaging means are connected. Alternatively, all of the physical feedback means to which the manual engaging means are connected may be comprised by the first body part and the physical feedback means comprised by the removable second body part or parts may be additional physical feedback means.

Additional physical feedback means comprised by the second body parts may comprise means to provide a sensation to a user (for example, vibration means to vibrate a portion of the removable second body part upon which a user is leaning) and/or may comprise means to modify the physical arrangement of the removable second body part (for example, in an embodiment wherein the removable second part of the body comprises a model of a portion of a patient's physical anatomy, the physical feedback means may be arranged to displace portions of the model).

Embodiments where some or all of the physical feedback means to which the manual engaging means are connected are comprised by the first body part may allow removable second body parts without physical feedback means to be interchanged with those with physical feedback means in use.

Removable second body parts may also comprise a physical model of an object upon which a procedure is to be performed (for example, where the procedure is a medical, dental, or veterinary procedure, the model may be of a portion of a subject's anatomy), such a model may comprise moving parts and/or may be articulated (for example, wherein the model is of a patient's joint, the joint may be manually or digitally actuatable). In use such a model may provide a surface for a user to rest on or to interact with when operating tools in accordance with the simulated procedure. Such a physical model may comprise sensing means and/or physical feedback means comprised by the removable second body part.

Removable second body parts may also comprise means for engaging with or connecting to the first body part, a base for supporting the second body part when it is not connected to the first body part, means for storing tools for a simulated procedure, a work surface for a simulated procedure to be performed upon, a power supply, a memory unit, control means for controlling the simulator and/or components of the second body part and/or input means for reprogramming the simulator and/or the processing means.

The first part of the body may comprise a docking station for receiving the removable second part of the body. In use, the docking station may support the removable second part of the body, for example when it is connected by the physical and electrical connector and is being used to simulate a procedure. The docking station may define the physical portion of the physical and electrical connector, for example the docking station may comprise an upper surface with a shape which matches a lower surface of the removable second body part. The second body part fits onto or into the docking station and may interlock with the docking station.

The docking station may also comprise the electrical portion of the physical and electrical connector (such that the docking station defines the physical and electrical connector), for example the docking station may comprise one or more electrical plugs, sockets, or contacts which engage with electrical plugs, sockets, or contacts comprised by the removable second body part, when the second body part is docked with the docking station. The electrical connector may act as part of the physical connector, allowing the second part of the body to be plugged into the first part of the body.

Alternatively, the electrical portion of the connector may comprise a cable which is connected to the second part of the body separately from the docking station.

The electrical portion of the connector may provide power to the removable second part of the body from the first part of the body or a power supply comprised thereby and/or may allow data to be transmitted between the first and second parts of the body. For example, this may allow components of the second part of the body to be controlled by the first part of the body, may allow the first part of the body to identify which of a plurality of second parts of the body has been connected to the first part of the body, and/or may allow parameters influencing or defining how a procedure is to be simulated which are stored on the second part of the body to be used by the first part of the body. In some embodiments the electrical portion of the connector may comprise wireless transceivers comprised by the first and second parts of the body The electrical and physical connector includes connections for sensing means and physical feedback means. These connections are typically electrical connectors comprised by the first party of the body for connecting the processing means (which is typically comprised by and/or housed within the first part of the body) to sensing means and physical feedback means comprised by the second removable body part.

This may allow the processing means comprised by the first body part to receive signals from a sensing means comprised by the second removable part of the body and to control physical feedback means comprised by removable second part of the body. This allows removable second parts of the body which comprise sensing and physical feedback means to be attached.

The first body part, the processing means, and/or the docking station may be adapted to recognise which of a plurality of removable second body parts are connected to the first body part. For example, by the shape of the second body part, by the physical or electrical connections which are made as the second body part is connected to the first body part and/or by one or more electrical information signals transmitted between the connected first and second body parts.

The first part of the body may provide a general-purpose simulator, to which a plurality of removable and interchangeable second body parts may be attached for the simulation of different procedures. Each individual second body part may comprise different components and may be associated with one or more procedures to be simulated when it is connected to the first body part.

In some embodiments, the second part (the "cartridge" or "module") is mountable to a docking station that provides physical and, preferably, electrical connections between the two parts (for example, if the second body part has electrical components to be connected to). By providing such a modular arrangement, the versatility of the system is considerably enhanced since the relatively expensive stand, processor, drive electronics and perhaps Haptic (force feedback) devices are mounted to the first part of the system and are thus re-used for each simulation application. The second part then comprises only those elements of the overall system that are specifically required for the simulation in question.

The first part provides connections for sensing and driving feedback means, such as haptic means, allowing a number of different modules to be attached for simulating various procedures. Since the modules are relatively small, a variety of different modules may be obtained and stored for each body. Thus, multiple procedures can be supported by the same first part at considerably lower cost than obtaining multiple simulation devices.

The display, which is connected to the processing means may be comprised by the simulator and in use may display information relating to a simulation being performed by the simulator (such as displaying a virtual environment).

In some embodiments the display may be comprised by and/or supported on the first part of the body (which may also comprise the processing means to which the display is connected).

In alternative embodiments, the display may be comprised by or supported on second part of the body, or may be discrete from the body (for example the display may be freestanding, may be on a separate stand, or may be a head-mounted display so as to provide a virtual reality experience to a user of the simulator). In these embodiments, the connection between the processing means the display may be made by an interconnecting cable, wirelessly, and/or through electrical connections between the first and second parts of the body.

In some embodiments, the simulator may comprise a plurality of displays as described above. In use the plurality of displays may show duplicate images or may show different images output from the processing means.

In some embodiments, the first part of the body preferably comprises a display, although a head-mounted-display (HMD) may alternatively, or additionally, be used in order to provide greater realism or to improve the range of experiences that may be simulated. The display may include a virtual reality (VR) imaging system or an augmented reality (AR) imaging system in order to enhance a user's experience. In some embodiments, the simulator may comprise a plurality of displays, for example, so as to enable a teacher to broadcast a tutorial to a number of students. Further preferably a mirror may be provided that may be displaceable between a first position, wherein a user may observe the display via the mirror, and a second position wherein the user may observe the display without the mirror.

In addition to one or more displays, which are visual output means, the simulator may comprise one or more audio output means (such as speakers) and/or one or more haptic output means.

The one or more manual engaging means, which are each connected to at least one of the one or more physical feedback means, are moveable by the user in free space may be. In some embodiments the manual engaging means may be tools, grips, or other hand held implements which are held by a user in use, may be hand attachments which fit onto and/or around a user's hand or portions thereof (such as finger tips), or may be connectors for the attachment of tools, grips, or hand attachments as described above thereto.

In use, a user may freely move the manual engaging means in space. Preferably the manual engaging means are freely moveable in three-dimensional space so as to allow a wide variety of procedures to be simulated. In preferred embodiments, the manual engaging means are supported by and/or at the ends of robot arms. The robot arms may define and/or may comprise sensing means for sensing inputs made to the manual engaging means and/or the physical feedback to which the manual engaging means are connected. In an example embodiment, the manual engaging means may be releasable connectors at the end of robot arms for to which a variety of hand held implements may be attached in use in order to simulate a variety of different procedures.

In some embodiments multiple robot arms may be connected to a single manual engaging means at different points, this may allow the orientation of the manual engaging means to be detected (when the manual engaging means is rigid) or may allow the displacement of a first portion of the manual engaging means with respect to a second portion thereof to be detected.

In embodiments where the manual engaging means are connectors, in some circumstances multiple such connectors may connected to the same tool, hand held implement, or hand attachments so as to allow the orientation or articulation thereof to be detected.

In alternative embodiments the manual engaging means may each be suspended from four or more cables which extend from motorized winches surrounding the area in which the procedure is simulated. As the manual engaging means is moved around the area, the winches may reel in or out the cables so as to maintain the manual engaging means in the same position. In another alternative embodiment, the manual engaging means may be unconnected to the remainder of the system and may be freely moveable, in these embodiments, the manual engaging means may comprise an inertial measurement unit in wireless communication with the processing means which may act as a sensing means.

Inputs made to the manual engaging means which are sensed by the sensing means may include the position in space of the manual engaging means, the orientation of the manual engaging means in space, the velocity of the manual engaging means movement, the acceleration of the manual engaging means, the force applied to the manual engaging means, inputs made to controls on the manual engaging means, and/or the displacement of first components of the manual engaging means with respect to second components of the manual engaging means.

The sensing means arranged to sense inputs to the manual engaging means may be arranged to sense one, some, or all of the inputs described above. In preferred embodiments the sensing means is at least partially defined by a robot arm to which the manual engaging means is attached, the manual engaging means may detect its own location in three-dimensional space, the velocity and/or acceleration of its components as it moves, and/or forces applied to it. In some embodiments the sensing means may be at least partially defined by two or more robot arms which may allow the orientation or internal displacement of a manual engagement means to be measured as described above.

The sensing means may also comprise physical controls on the manual engagement means such as buttons switches, pressure sensors (for example, to detect when a tool is gripped), articulation sensors, optical sensors or other sensors. The sensing means may also comprise sensors internal to a hand-held implement or tool, such as an accelerometer or an inertial measurement unit.

The sensing means, or individual sensing components comprised thereby, which are connected to the processing means, may communicate with the processing means wirelessly and/or via a pathway of one or more electrical conductors.

The one or more physical feedback means may be actuatable by the processing means to provide physical feedback to a user. This may include providing haptic feedback at the manual engaging means being manipulated by a user, or exerting forces thereon (such as resistive feedback forces). Physical feedback may also include actuating a model comprised by the simulator upon which a procedure is being simulated on, or providing force feedback to other components of the system (for example vibrating a work surface upon which a user is resting, or vibrating the display).

One, some, or all of the one or more physical feedback means may have a manual engaging means connected thereto. In some embodiments a plurality of manual engagement means may be attached to a single physical feedback means, and/or a plurality of physical feedback means may be attached to a single manual engagement means. Other examples of physical feedback means may include vibration motors within tools or other hand held implements which define the manual engagement means.

In preferred embodiments, one, some, or all of the physical feedback means to which manual engagement means are connected are, or comprise robot arms. These robot arms may be operable to apply a force to the manual engagement means connected thereto, for example, to slow or resist displacement of the manual engagement means, to move the manual engagement means in response to a force applied thereto, and/or to displace the manual engagement means in 3D space.

One, some, or all of any robot arms comprised by the simulator may be controlled using an impedance control method, for example wherein in response to displacement of the robot arm the controller applies resistive forces to the robot arm dependent upon the movement of the robot arm. Alternatively, or additionally, one, some or all of the robot arms may use an admittance control method wherein when a force is exerted upon the robot arm; the robot arm is displaced by the controller in a manner dependent upon the force applied.

In some embodiments, the simulator may comprise discrete physical feedback units which are separate from the displaceable manual engagement means and the first and second parts of the body. For example, the simulator may comprise wearable physical feedback units such as vests, bands, or gloves. Such discrete physical feedback units may be connected to first and/or second parts of the body of the simulator via cables, or via wireless communication (for example the units may be battery powered and comprise a wireless transceiver).

In some embodiments of the simulator, the first part of the body comprises a plurality of robot arms with manual engagement means at their distal ends. The robot arms act as sensors detecting displacement of the manual engagement means and/or forces applied thereto, and are operable to provide force feedback to the manual engagement means.

The robot arms thereby define the sensing and physical feedback means. In these embodiments, the first body part preferably further comprises the processing means which is in controls and monitors the robot arms. The physical and electrical connector for connecting the first and second body parts comprises connections for allowing physical feedback means and/or sensing means comprised by the second body part to communicate with the processor, if the second body part which is connected to first body part in use comprises compatible physical feedback means and/or sensing means. If a second body part without suitable physical feedback The processing means is connected to the display, to the sensing means, and to the physical feedback means. The processing means may receive from the sensing means inputs which have been made at the manual engaging means by a user and which have been detected by the sensing means. In response to these inputs the processing means may actuate the physical feedback means to provide physical feedback.

In preferred embodiments, the processing means is comprised by and/or housed within the first body part. The processing means may be in electronic communication with any sensing means, physical feedback means, and/or displays comprised by the first part of the body via a pathway of electrical conductors, and/or wirelessly. Such a processing means may be in contact with a suitable sensing means and/or physical feedback means comprised by a second body part connected to the first body part via the connectors for sensing and/or physical feedback means comprised by the physical and electrical connector.

The processing means may be operable to perform one or more simulated procedures pre-programmed thereon, may be operable to perform one or more simulated procedures programmed on a piece of removable in electronic communication with the processing means, and/or may be operable to perform one or more simulate procedures programmed into a second removable body part, In use the processing means may determine, whether or not a second body part is connected to the first body part, which of a plurality of second body parts is connected to the first body part, which of a plurality of procedures to simulate (for example, in response to which of a plurality of second body parts are connected to the first body part, and/or which of a plurality of tools are connected to connectors comprising manual engagement means and/or in response to user input).

In some embodiments, the manual engagement means may be a particular tool or a coupling for one or more tools that can be attached to the manual engagement means so that the user is presented with a familiar-shaped tool while using the simulator. The tool may be equipped with sensors and/or actuators to further enhance the realism of the simulation. The term tool further encompasses so-called thimbles which are placed over a user's fingertips to interact with the system, so as to track the movement of a user's hands. In addition, hand gestures may be tracked using known techniques and head-tracking may be performed to track the user's eye line when using the display mounted to the first part of the device. These tasks may be performed by additional sensing means comprised by the first and/or second body part.

Preferably, in use, the first part of the body of the simulator, and/or the processing means which may be comprised thereby, can determine which module (second body part) is connected to the first body part (and/or docked in the docking means) automatically and thus proceed to inform the processing means so that appropriate software is loaded or launched prior to use.

In some embodiments, the simulator may be operable to perform a simulation without using sensing, physical feedback, and manual engagement means comprised by the first part of the body, if a suitable second body part comprising sensing, physical feedback, and manual engagement means is connected to the first part of the body, the means of the second part of the body may still be controlled by a processing means comprised by first part of the body which may be in contact with the first part of the body via the physical and electrical connector.

According to a third aspect of the present invention there is provided a module for a simulator as described above, the module comprising a physical connector arranged to engage with the physical connector on the first part of the body.

The module may be a second removable portion of the body of a simulator, as described above.

Preferably, the module comprises one or more sensing means connected to an electrical connector that is arranged to engage with the electrical connector for sensing means comprised by the physical and electrical connector which may be mounted to the first part of the body.

Further preferably, the module comprises one or more physical feedback means connected to an electrical connector that is arranged to engage with the electrical connector for physical feedback means comprised by the physical and electrical connector which may be mounted to the first part of the body. Thus, a specific physical feedback means is provided, and may be optimised, for a particular simulation.

Several modules are envisaged for various procedures, including one adapted to simulate a procedure performed via a body orifice, which includes a tube extending from the module, a tool adapted to be held in a user's hand, and an elongate member attached to the tool and extending along the tube. The module includes physical feedback means, for example a haptic device, connected to the other end of the elongate member. By suitable programming of the processor, the user is provided with a realistic sensation of performing examination and interventional procedures using wires or tubes including minimally invasive surgical procedures.

In another example, the module further comprises physical and electrical connectors (in addition to those that connect to the first part) to allow the preparation or prototyping of simulations. This provides users of the system with a "sandbox" arrangement that can be used to provide simulators having a particularly niche application or to permit the development of further modules that may be produced for use with the first part of the simulator.

A known trade-off in haptic technology is the degree of force which can be applied compared with the size of the actual device and ancillary equipment. In other words, large actuators/motors can provide high forces which can increase the realism felt by the user. However, because some of the motors are mounted on the joints of the robot arms there are drawbacks which may restrict the range of possible applications. Specifically, if a large motor is mounted on a moving part of the mechanism the mass of this motor must be carried meaning that the user will perceive this extra mass/weight. This may affect the realism of a simulation in which a user is manipulating a light tool in three-dimensional space.

According to a fourth aspect of the present invention, there is provided a simulator comprising at least one robot arm having a user-engaging portion and at least two actuators arranged to provide forces on the robot arm, wherein the robot arm is mounted so that a mounting of the robot arm is movable between a first and at least a second position.

A user engaging portion may be a tool, hand held implement, hand attachment, or connector therefore as describe above in the first and second embodiments.

In certain configurations of haptic device kinematics particular directions of force output are larger than others or, in this case, a particular direction utilises motors which are not carried by the mechanism and can therefore be permitted to be much larger without significantly impacting on the dynamic behaviour of the system. Due to the particular choice and/or arrangement of actuators, a certain direction or certain directions of force feedback can be greater than others. Thus, the force that can be provided in one direction is greater than that which can be applied in other directions. Hitherto this has meant that greater force can only be provided in one direction by a simulator.

For example, robot arms may be able exert greater forces in a plane orthogonal to the axis of the motors at the base (mounting) of the arm (as these motors are not carried by the arm and so may be heavier without decreasing the performance of the arm). Therefore rotating the mounting of the robot arm may rotate the plane within which greater forces may be exerted, thereby allowing the directions of greater applicable force to be aligned with the requirements of a procedure to be simulated.

However, for simulating different procedures, it is beneficial to provide greater force feedback in different directions. Orthopaedic drilling is an example as the force in the direction in line with the axis of the drill is significantly greater than others during the drilling process: Barrow, A., Akhtar, K., Gupte, C., & Bello, F. (2012). Requirements analysis of a 5 degree of freedom haptic simulator for orthopaedic trauma surgery. *Studies in health technology and informatics,* 184, 43-47.

Thus, this aspect of the present invention provides this flexibility without having to increase the size and cost of the haptic arrangement.

A gimbal arrangement with mechanical locking mechanisms will typically be provided to allow for switching the assembly between positions.

While the two positions that can be occupied by the robot arm assembly are described herein as orthogonal to each other, this need not be the case. Preferably, a further position (i.e. a total of three possible positions) or positions can be provided. In some embodiments, the mounting may be rotatable through, and lockable in any of a continuum of positions.

While this aspect of the present invention is preferably used in conjunction with the modular arrangement of the first aspect, this arrangement of a simulator may also be used in its own right.

An arrangement which uses a pair of robot arms to provide greater force and/or six degrees of freedom is known. (Six degrees of freedom add pitch, roll and yaw to x, y and z-axis motion in a three-dimensional Cartesian system). However, these arrangements have consistently used the two robots in a twin arrangement with their corresponding arms operating in a fixed orientation, such as parallel. However, such an arrangement lacks flexibility.

Preferred embodiments of the invention will now be described, by way of example, with reference to the figures.

DETAILED DESCRIPTION OF THE FIGURES

Figure 1:
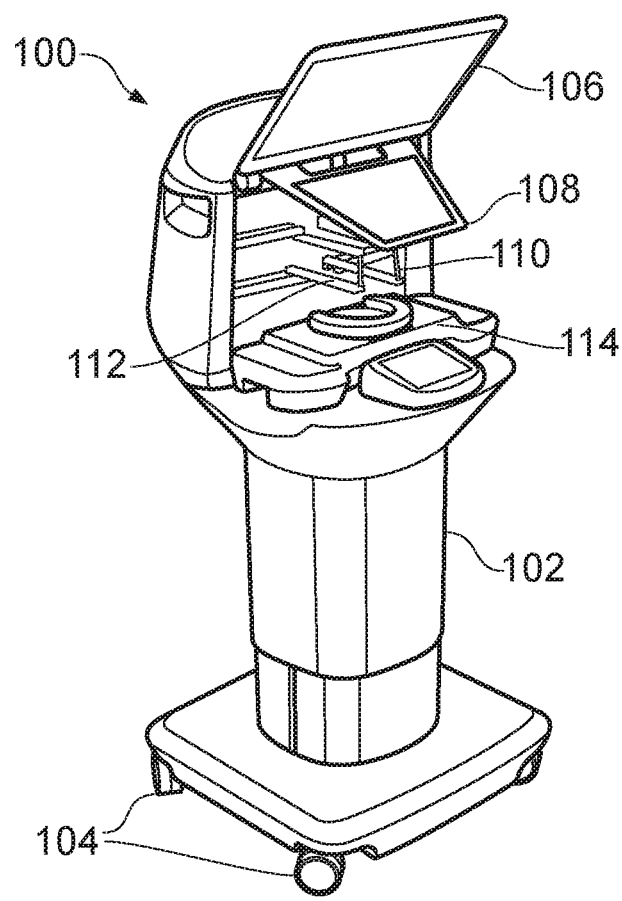
FIG. 1 shows an overall view of a medical simulator in accordance with the second aspect of the invention with a removable module connected.

FIG. 1 shows a medical training system 100 according to the second aspect of the invention. A stand 102 is provided which carries the components of the system. The stand is provided with castors 104 to allow the system to be moved easily and the stand is also height-adjustable to allow use by users of different heights and also to place the tools and screen at the appropriate height for simulation of different medical procedures.

A display screen 106 is arranged towards the top of the system and the lower edge of the display screen is hinged to allow it to adopt at least a substantially vertical position (for direct viewing) and a folded forward position in which it is viewed by a user via a mirror 108. Three typical usage scenarios for the system will be discussed below. A further head mounted display (not shown) may also be used in addition or as an alternative to the main display 106. As will be appreciated, a head mounted display (HMD) provides a more immersive environment for a user but the resolution of conventional displays is often better and this more appropriate for detailed simulations such as dental drilling.

Robot arms 110, 112 comprise a haptic arrangement in which tools or other user engagement means are connected to the distal end of the arms. More detail is provided below. A removable module 114 is shown mounted to the arrangement and this module can be removed and replaced with one of a plurality of alternative modules to permit simulation of different procedures.

The system further comprises a processor (not shown) connected to the display, to the tools and to a Haptic arrangement that provides the physical feedback to the user.

The system preferably also comprises a keyboard (not shown) connected to the processor to allow the user to select particular programs, retrieve particular simulations or request playback of a previously-conducted procedures. Other UI devices could be used in addition or alternatively to interface with the simulator.

The medical training system makes use of Haptics. Haptics relates to the use of motors under computer control to provide a sensation to a user of something that isn't there. For example, if the user is holding a stylus & attempts to push that stylus in a first direction, the haptic arrangement (often called a robot) may use a set of motors and levers to resist the pushing motion. The user's nervous system interprets this as the stylus hitting a hard surface (since he or she cannot push though it). By careful programming of the system, different tissues and arrangements of tissues can be simulated & the user given the appropriate feedback via the stylus or other hand-held device.

While FIG. 1 shows a floor-standing device, it will be appreciated that a desk-mounted version could be provided with the same advantages.

The arrangement of FIG. 1 can be used in three different configurations, firstly as a dental trainer. The user is seated and looking down into the mirror 108 which shows a reflection of the display screen 106. The user manipulates tools (connected to one or both of the robot arms 110,112) beneath the mirror at approximately the same distance beneath the mirror as the screen is above the mirror. The graphical output from the screen is calculated to recreate an apparent location of virtual objects, based on known positions of the user's head, monitor and mirror, so that, from the view point of the user, the graphically rendered objects appear to co-locate with their hands/the tool. In addition, the mirror extends the optical path from the screen to the user's eyes, effectively increasing the resolution of the image (in terms of dots per inch (DPI)).

In a second configuration the system provides a laparoscopy trainer. The user is standing and operates two tools at around waist height, these typically being a diathermy, scissors, staplers or grasper. Also, a camera is provided in addition to the two tools. The camera functionality is provided using the additional digital interface provided through the modular docking system while the two tools are coupled to the "on-board" haptic devices, i.e. those robots 110, 112 mounted in the first part of the simulator.

In a preferred arrangement for Arthroscopy, an articulated knee joint is provided on the module together with sensors to determine the angle of the knee. During the simulation of the procedure the surgeon will manipulate the knee to open up the tissues. The controller then uses this input to alter both what is shown on the screen and the range of movement that is possible with the tool. The simulated tool and the camera control can be simulated by the robots mounted on the first part of the apparatus. Colour coding can be used to ensure that the correct tools are coupled to the correct robots when the module is installed.

By adjusting the position of the haptic devices can also cover a range of similar operating movements such as SILS (single incision laparoscopy) where the tools enter the abdomen though a single opening and are very close together through to arthroscopy where the haptic devices could be moved much further apart to permit the large motions typical of these procedures. The mirror is folded out of the way and the user looks at the screen directly as he or she would in an actual arthroscopy operation. The screen shows the view from the camera which may be operated by the surgeon or by an assistant.

The third option provides an orthopaedic trainer. In this scenario the screen is viewed directly as for laparoscopy but location of the tools is at, or close to, eye level. The screen is arranged on a double-hinge to allow location of the screen close to the tools and then the whole system can be raised up on the main stand.

Figure 2:
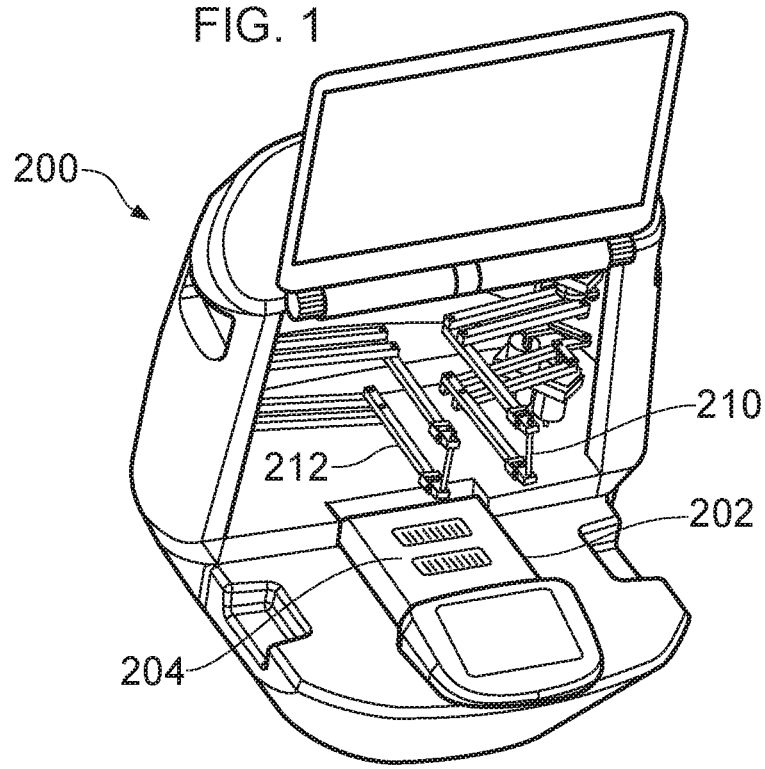
FIG. 2 shows an overall view of a medial simulator in accordance with the second aspect of the invention with no removable module connected.

FIG. 2 is a variation on the medical simulator 100 shown in FIG. 1, with the interchangeable module 114 removed. The base unit 200 is provided with a docking station 202 as shown which provides a secure physical and electrical connection to the module. In contrast to some existing arrangements, the module may comprise force feedback means, or haptic mechanism, and thus appropriate electrical connections 204 are provided that can provide the appropriate voltage and current to drive the haptic arrangement as well as convey feedback from sensors etc. The mirror 108 has been removed or folded away into the base unit 200.

Figure 3:
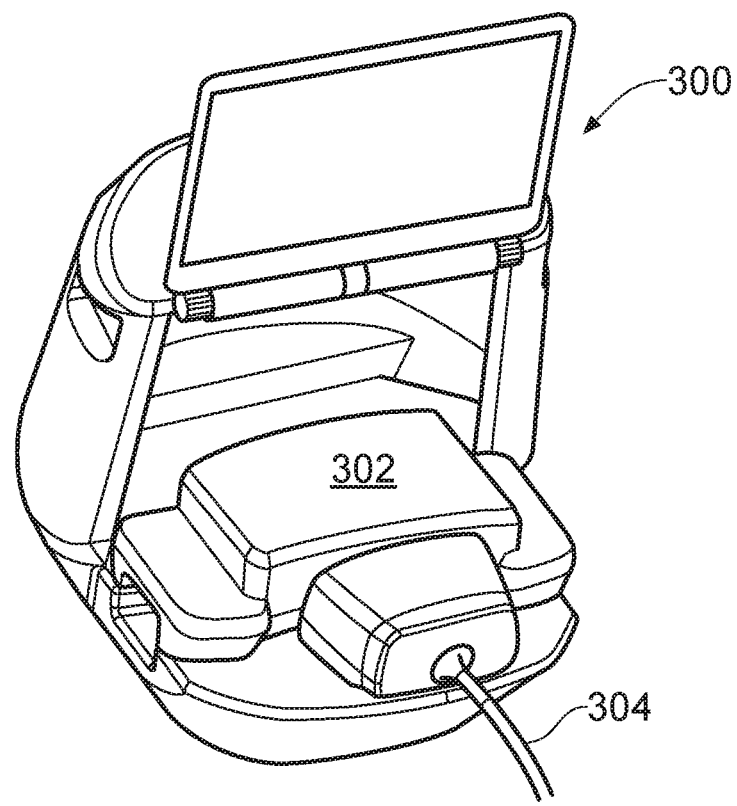
FIG. 3 shows an overall view of the medical simulator of FIG. 2 with a removable module connected and the robot arms not shown for clarity.

FIG. 3 shows a further variation 300 with the robot arms omitted for clarity. In this embodiment, the module 302, in conjunction with the base unit, provides training in procedures for examination (Colonoscopy, bronchoscopy), or common procedures using much smaller gauge wires, e.g. Intravenous placement of a stent. It could also simulate NOTES (Natural orifice transluminal endoscopic surgery) process for example, for trans-gastric cholecystectomy (removal of the gall bladder via the stomach).

In such procedures, a tube is inserted into a patient, via the mouth, nose, ears, vagina, penis, anus or a vein or artery. A tube 304 is provided with a flexible wire inside. Within the module, the wire is attached to a haptic device that can provide force towards and away from the user as well as provide and respond to clockwise and counter-clockwise torque. For example, a module for catheterisation would track the position of the guidewire and catheter separately, providing both constant and transitional forces to recreate the feel of passing through the arteries of a patient, getting jammed and so on.

Figure 4:
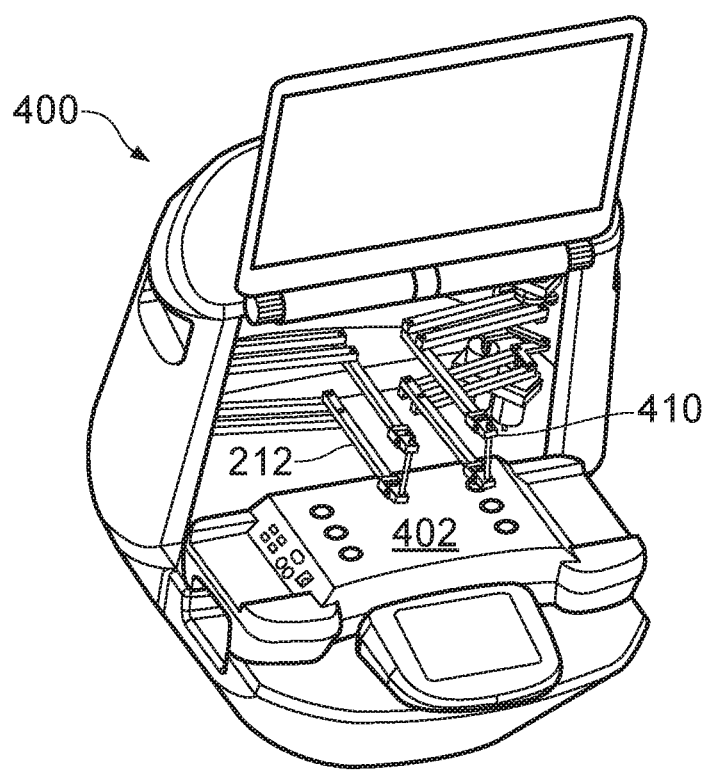
FIG. 4 shows an overall view of the medical simulator of FIGS. 2 and 3 with an alternative module for prototyping simulated procedures connected.

FIG. 4 shows a further variation 400 of the simulator in which the module 402 is not designed to simulate a specific procedure but rather allows prototyping of specific modules. The module is provided with a number of electrical connectors, for example USB connectors, to allow further mechanical and electrical tools to be integrated in the simulator.

Figure 5:
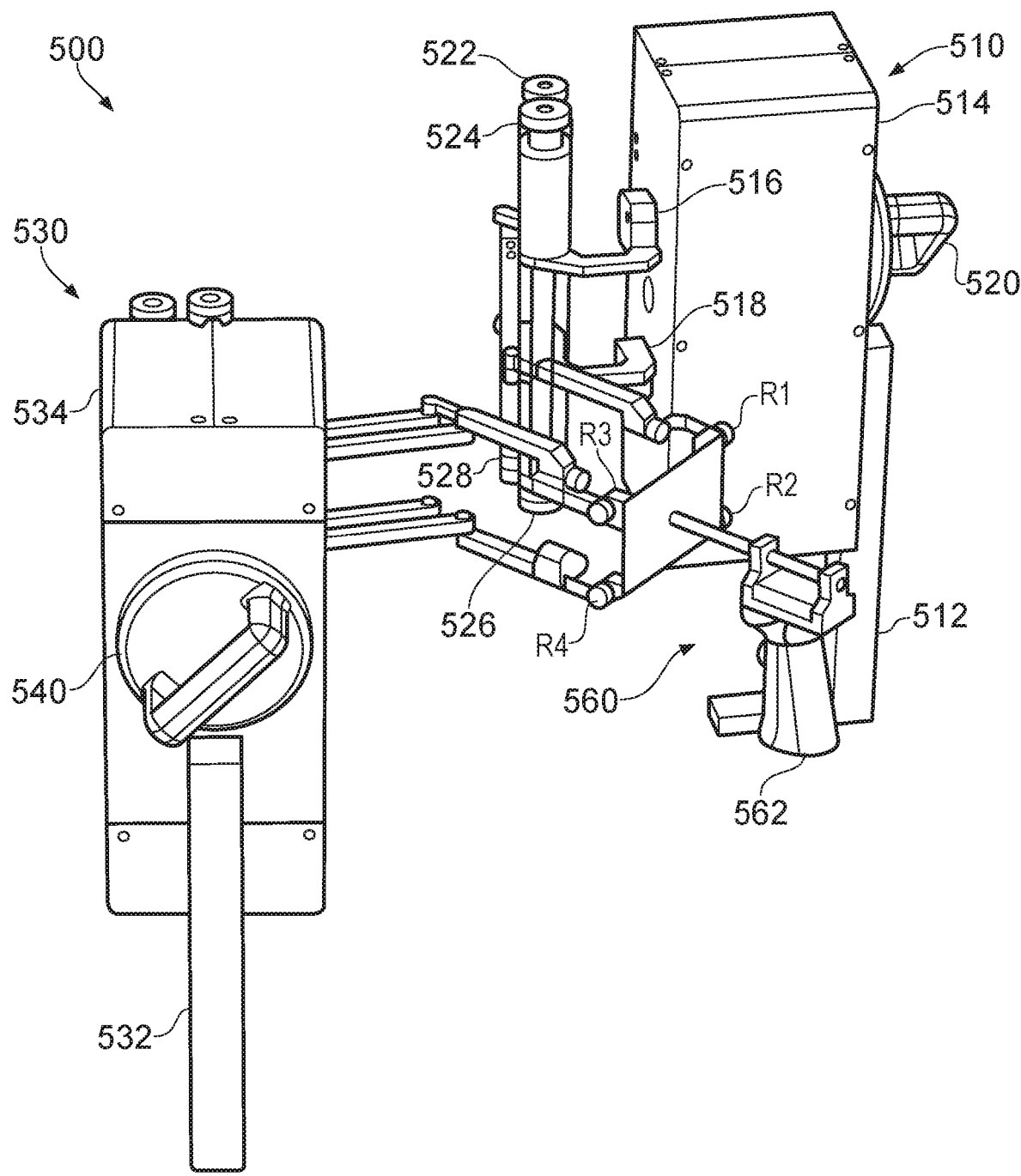
FIG. 5 shows an overall view of a haptic training device having a movable arrangement of robot arms in accordance with the fourth aspect of the invention.

FIG. 5 shows an isometric view of a haptic arrangement 500 comprising two pairs of robot arms, each arm comprising a first actuator/motor mounted within a base unit and conventional robot arms provided with second and third actuator/motors mounted on the arms themselves. In this embodiment, as the second and third actuator/motors are mounted on the arms, they are smaller and less powerful than the first actuator/motor, so as to decrease their weight, and the weight of the robot arms. This gives the possibility of greater force feedback in a particular direction (provided by the first actuator) than in other directions. This embodiment of the invention allows that particular direction to be altered to suit the circumstances (such as a particular procedure to be simulated) by rotating the first actuators within the base units.

First and second robots are mounted to a first base unit 510 shown here as a case 514 (but which could comprise another structure). The case 514 is supported by a strut 512 that is connected to the case by a rotating coupling that can be turned between a first position and a second position by a handle 520. The first respective actuators (not shown) of the first and second robots are connected to respective rotating couplings 516, 518.

These couplings each carry two further actuators 522, 524 and 526, 528 and robot arms to provide two separate robots having distal ends R1 and R2.

Third and fourth robots are mounted to a second base unit 530 shown as a case 534. The second base unit is substantially identical to the first base unit, also having a supporting strut 532 and a rotary coupling that can be turned by a handle 540 between at least a first and a second orientation. The distal ends of the third and fourth robot arms are shown as R3 and R4.

All four distal ends R1, R2, R3, R4 of the robot arms are connected to a tool indicated generally at 560, in this case an orthopaedic surgery tool having a handle 562, although a plurality of different tools are releasable and interchangeably connectable to the distal ends of the robot arms. With appropriate driving of the motors, the arrangement of robot arms allows the tool 562 to move through three-dimensional space with appropriate force feedback being applied to the tool by the robot arms. The arrangement of four robot arms allows torque to be applied in 3 directions.

As stated, the base unit is mounted to a gimbal (or other suitable rotating mechanical support) that permits the base unit to adopt more than one position. FIG. 5 shows the base units in a first (or "vertical") position which means that greater force feedback can be provided effectively in a vertical direction whereby the movement of the tool 562 rotates the first respective actuators of the four robot arms.

Figure 6:
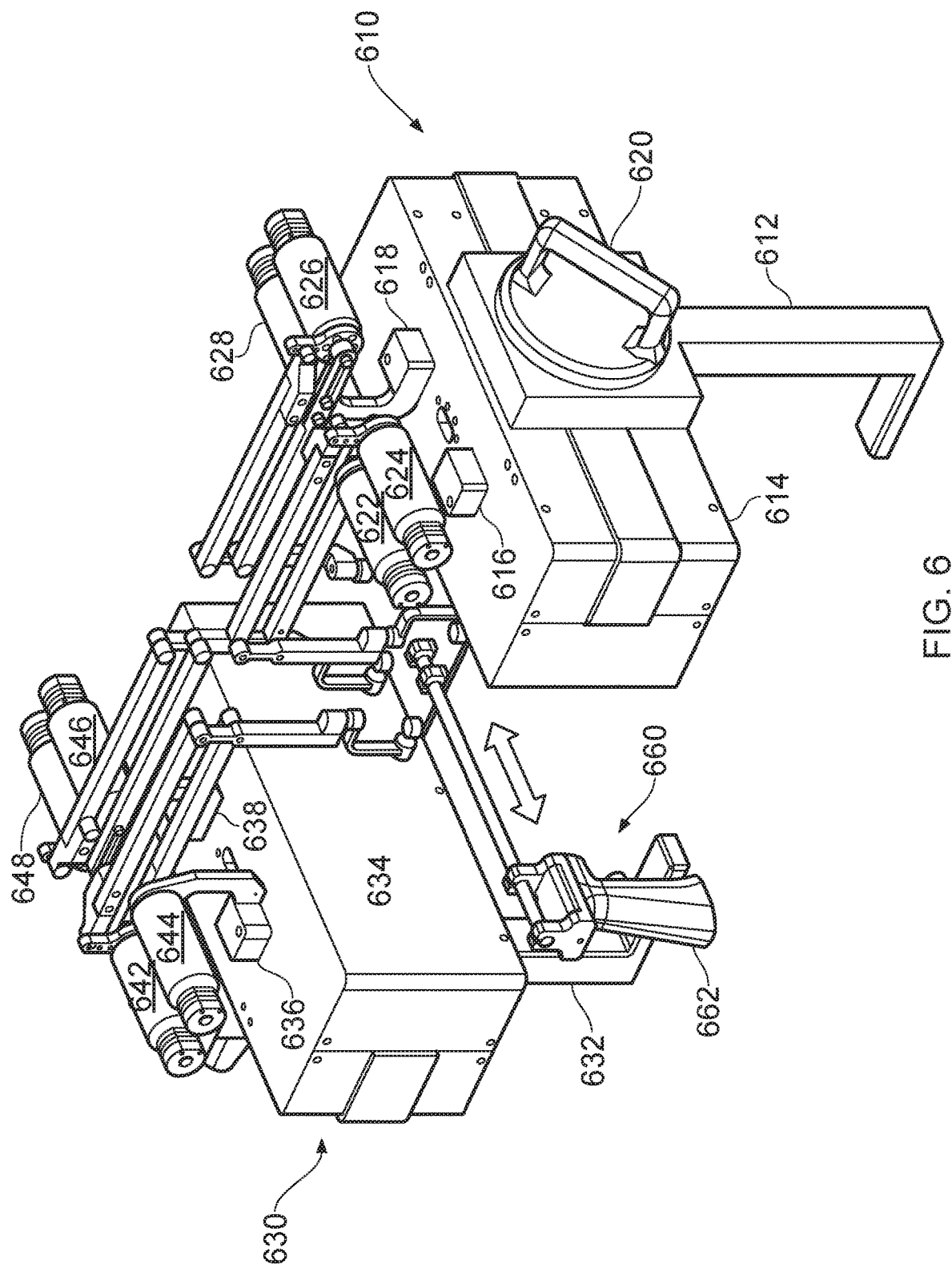
FIG. 6 shows an overall view of the device of FIG. 5 with the robot arms in a second orientation.

FIG. 6 shows an isometric view of two pairs of robot arms 610, 630 in a second (or "horizontal") position which means that greater force feedback can be provided in a direction as shown by the double-headed arrow in the figure, this being the direction that largely corresponds to the range of motion of the larger actuators. Two base units 614, 634 similar to those shown in FIG. 5 are mounted to struts 612 and 632 respectively. The base units are rotatable between at least the horizontal position shown and another position such as a vertical position. Handles are provided (only the handle 620 on base unit 610 is visible in the figure) to move the base units between the different positions. The arrangement must be securely mounted in any orientation along a continuum of orientations between the first and second positions to ensure the integrity of the haptic feedback mechanism. Suitable mounting and locking arrangements will be apparent to the skilled person.

A user-engaging portion 660 in the form of a tool 662 is coupled to a distal end of all four robot arms. The first pair of arms is driven by actuators within the base unit 614 to drive output arms 616 and 618 respectively. Output arm 616 is coupled to further actuators 622 and 624 and via first robot arm to a coupling to the tool 662. Similarly, output arm 618 is coupled to further actuators 626, 628 and via second robot arm to a coupling to the tool 662. The robot arms mounted to the second base unit 634 are arranged and operate in the same manner.

The tool 662 is free to move within a 3-dimensional workspace and force feedback can be given to the user in all three dimensions. However, because the actuators mounted within the base unit are more powerful than those mounted to the robot arms, greater force can be applied by the robots in the direction that causes rotation of the output arms 616, 618, 636, 638. Consequently, stronger force feedback can be supplied in the direction where it is needed without over-engineering the force-feedback mechanisms in other directions. One application for this arrangement is in orthopaedic drilling, as mentioned above, in which a significant feedback force is required along the axis of the drill.

While two, orthogonal, alternatives have been illustrated in FIGS. 5 and 6, two non-orthogonal positions and/or further positions may be provided to give greater flexibility in the direction of applicable forces. In addition, the movement between the two positions need not be a rotation as shown here. Further, although arrangements operating in three dimensions are shown, a simpler system operating only in two dimensions (having only two actuators/motors) may alternatively be provided.

While two pairs of robots are illustrated in this example, the principle if equally applicable to a single pair or even a single robot. The arrangement shown in FIGS. 5 and 6 may be arranged as a stand-alone arrangement or used in conjunction with the modular arrangement shown in FIG. 1.

Figure 7:
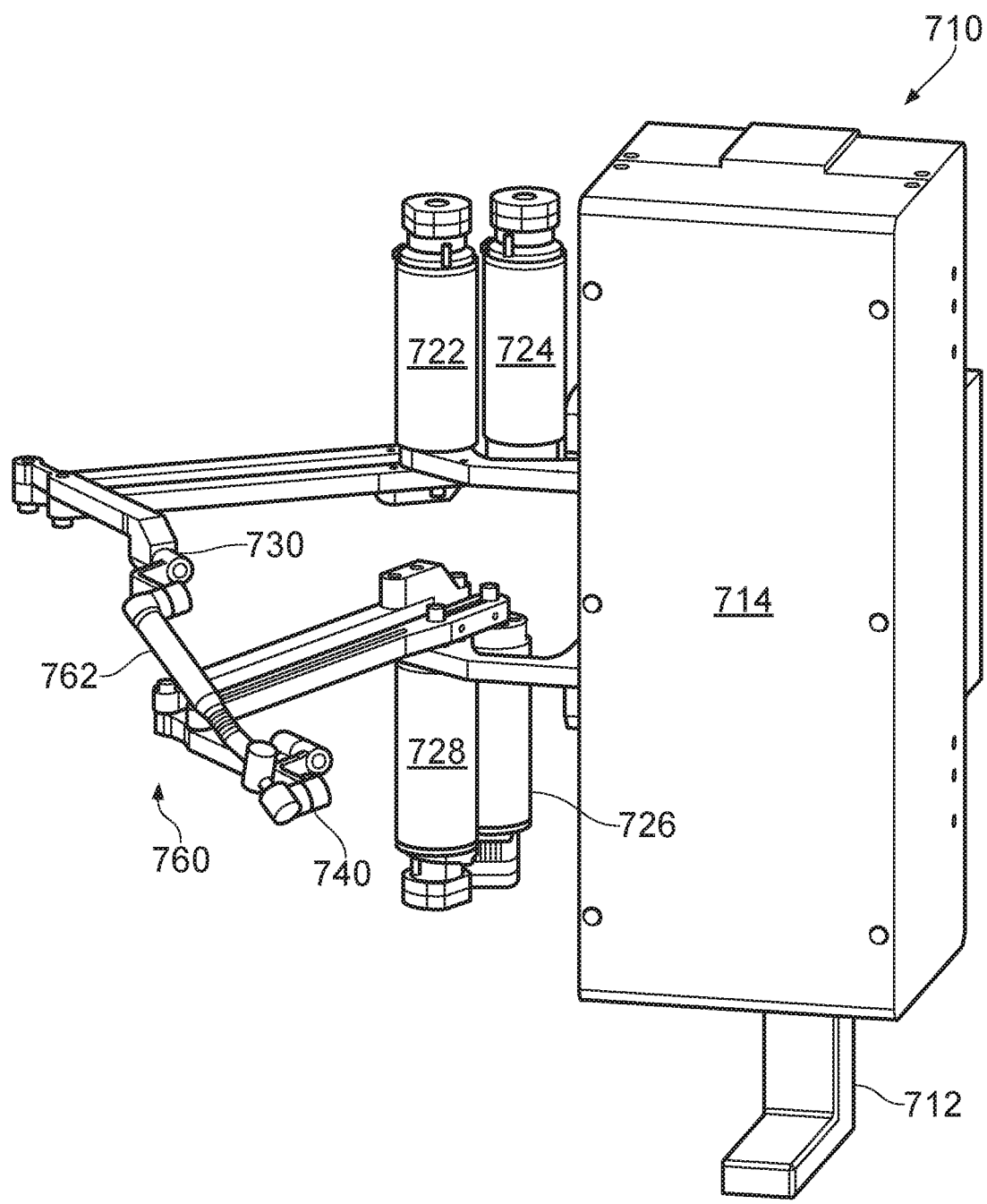
FIG. 7 shows an overall view of a simulator in accordance with the first aspect of the invention.

FIG. 7 shows a view of a haptic arrangement using a pair of robot arms. A base unit similar to those of FIGS. 5 and 6 carries the two arms and includes two actuators. The key difference in this embodiment is that the distal ends of the arms are not coupled together in a fixed arrangement but are capable of accepting different tools for different purposes. The manner in which the tool is attached to the robot arms allows a flexible trade-off to be made between force and torque feedback.

In the figure a pair of robots 710 are mounted to a base unit 714 which in turn is supported by a strut 712. In common with the previous embodiment, the base unit may be moved along a continuum of orientations between a first orientation and a second orientation, but this feature is optional in the present embodiment. A first robot arm further comprises actuators 722 and 724 driving a robot arm having a known arrangement. The distal end 730 of this robot arm has a coupling for a tool. A second robot arm further comprises actuators 726 and 728 driving another robot arm having a known arrangement. The distal end 740 of this robot arm also has a coupling for a tool. The distal ends of the two arms are joined by a tool 760, in this example a dental drill 762.

The dental drill is movable within a 3-dimensional workspace. In contrast with a conventional arrangement (in which the drill is attached at a single point to the robot arm or arms), however, fitting the drill between the two robot arms permits greater control over the force and torque which are sensed by the user. By providing different tools coupled to the robot arms so that the distal ends of those arms are differently-spaced, the appropriate force and torque feedback can be provided to simulate a number of different procedures. The force and torque applied, as well as the workspace may be optimised to match the specific procedure which is being simulated.

While a conventional arrangement with three motors per arm is shown, this aspect of the invention can be applied to other arrangements such as the pantograph described in our co-pending application (UK Patent Application GB1617167.0) filed on the same date as the application from which the present application claims priority. Moreover, while this embodiment is preferably used in conjunction with the modular arrangement of FIG. 1 and the re-orientable arrangement of FIGS. 5 and 6, this is not essential and this aspect of the invention may be used in its own right.

A third robot arm may be provided that is also provided with a connector for connection to the tool. A four-arm arrangement as illustrated by the previous embodiment may also be used in at least two different applications. In a first application, all four robot arms are connected to a tool while in a second application, a first pair of robot arms are connected to a first tool while the second pair of robot arms are connected to a second tool. This may be especially valuable for simulating Arthroscopy where the robot-mounted tools are moved further apart to permit the large motions typical of these procedures Simulating various medical procedures requires various different tools to be used which tools will be of different sizes and operate in different orientations. To accommodate different types and sizes of tool, the robot arms may be operated in a number of different orientations. Some modification of the software will be required to accurately map the location of the tool to the virtual environment.

Each robot arm is provided with a means of attaching a tool thereto. This may conveniently comprise the magnetic connector disclosed and claimed in our co-pending application identified above but other connectors are suitable. One or both of the arms may be provided with an electrical connector to allow electrical signals for sensing or driving of the tool to be conveyed.

Figure 8:
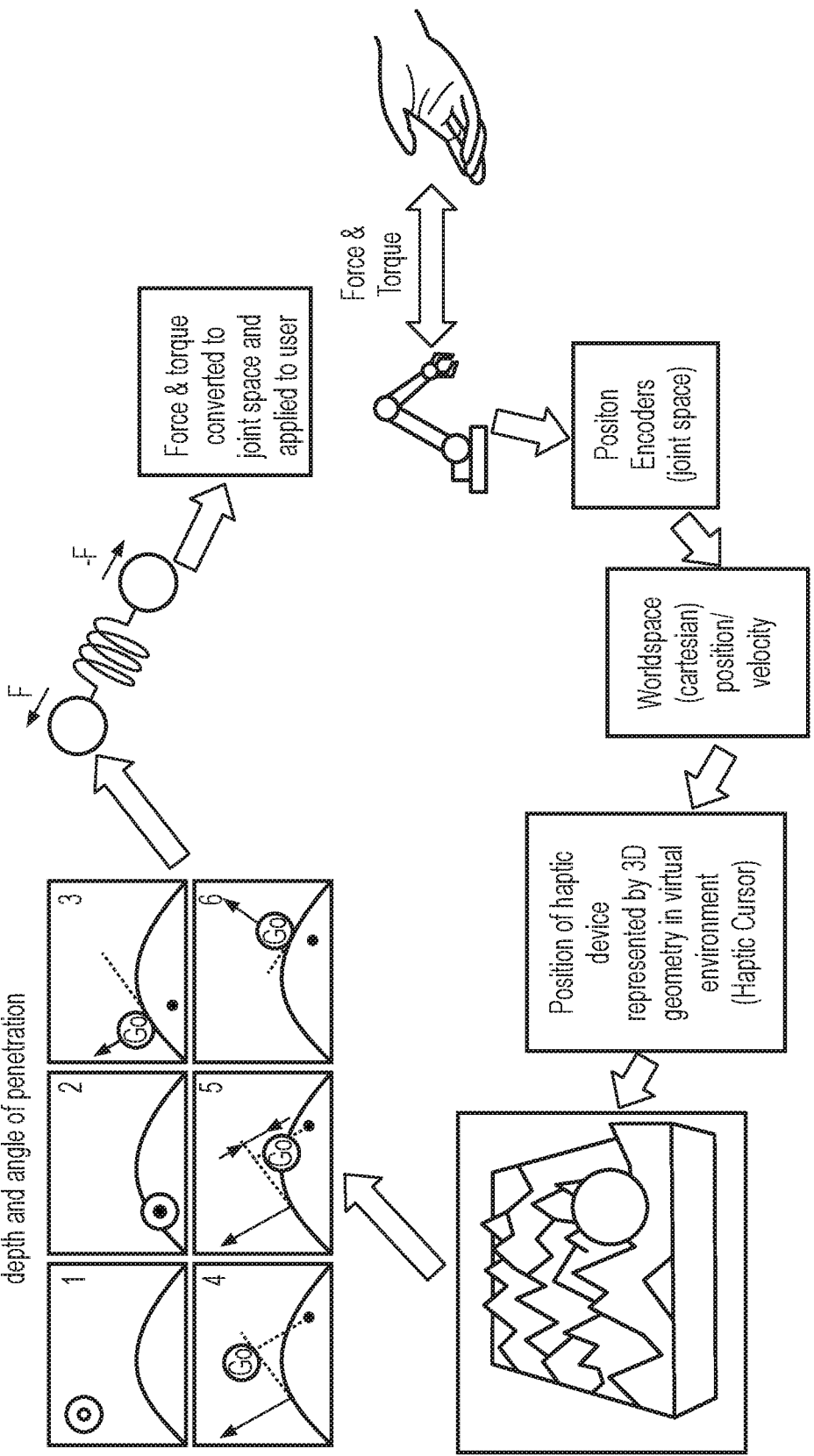
FIG. 8 shows a block diagram illustrating how software running on the processor comprised by a simulator in accordance with the second aspect of the invention operates.

FIG. 8 is a block diagram showing how software, which runs on the processor, performs. Force and torque applied by a user via a tool (or end-effector) to the haptic device, the resulting motion of which is measured by position encoders whose outputs are converted by the processor into an appropriate Worldspace such as Cartesian coordinates. The processor then computes where this would put the tool in 3-dimensional space to generate a haptic cursor. Known three-dimensional rendering techniques then generate a visual display which may be via a flat screen, 3-dimensional screen used in conjunction with coloured or polarising glasses or a virtual reality headset as appropriate to the application.

When the Haptic cursor is in free space (i.e. not touching anything in the virtual environment) then there is no force-feedback to the user that is to say that the user experiences no resistance to free movement of the tool. However, once contact or intersection between the virtual cursor and an object in the virtual environment is detected, a force and torque are calculated based on the depth and angle of penetration. These parameters are then converted back to joint space and applied to the tool (and hence the user) by a series of motors, gears and levers as is known in the art.

For further details of how Haptic software operates please see, for example, Harwin, W. S., & Melder, N. (2002, July) "Improved Haptic Rendering for Multi-Finger Manipulation Using Friction Cone based God-objects", in Proceedings of Eurohaptics conference (pp. 82-85) and available at:
http://citeseerx.ist.psu.edu/viewdoc/download?doi=10.1.1.10.6808&rep=rep1&type=pdf The described arrangement uses a so-called impedance style of control in which the position of a user device is converted into a force that is applied by actuators. Alternatively, an admittance style of control may be used in which a force applied is converted into an acceleration by the control algorithm.

Other suitable haptic techniques may be used as will be apparent to the skilled reader. While the present invention has been described with reference to a medical training simulator, it is equally applicable to training of other manual tasks such as writing, plumbing, welding, carpentry, and the training of blind or partially sighted students.

It is further appreciated that variation may be made to the aforementioned embodiments without departing from the scope of the invention as defined in the claims.

The invention claimed is:

1. A simulator workstation comprising
a first part of a body comprising:
 a stand,
 drive electronics,
 two or more Haptic force feedback devices mounted to the body,
 a first robot arm,
 a second robot arm, and
 a controller,
the first robot arm having a first connector at a distal end for interchangeably connecting to any of a plurality of different tools, and a first tool identifying means to detect using the connection which of the plurality of different tools has been interchangeably connected to the distal end of the first robot arm,
the second robot arm having a second connector at a distal end for interchangeably connecting to any of the plurality of different tools, and a second tool identifying means to detect using the connection which of the plurality of different tools has been interchangeably connected to the distal end of the second robot arm,
wherein the plurality of different tools are each configured to be connected to either of the first connector of the first robot arm or the second connector of the second robot arm,
a second part of the body forms a cartridge for attachment to the first part of the body, the cartridge comprising:
 the plurality of different tools,
whereby the controller is operable to simulate one of at least two different procedures in response to an attachment to the first robot arm or to the second robot arm of a given one of the plurality of different tools associated with the at least two different procedures.

2. The simulator workstation as claimed in claim 1, further comprising a third robot arm with a third connector at a distal end for connecting to any of the plurality of different tools.

3. The simulator workstation as claimed in claim 1, further comprising:
a third robot arm having a third connector at a distal end for interchangeably connecting to any of the plurality of different tools, and
a fourth robot arm having a fourth connector at a distal end for interchangeably connecting to any of the plurality of different tools.

4. The simulator workstation according to claim 1 wherein the controller detects movement of, and/or forces applied to the first robot arm and the second robot arm, and actuates the first robot arm and the second robot arm to apply force feedback to the one of the plurality of different tools attached thereto in response.

5. The simulator workstation according to claim 4 wherein the first robot arm and the second robot arm are controlled using an impedance control method in response to displacement of the first robot arm or the second robot arm, the controller applying resistive forces to the displaced first robot arm or the displaced second robot arm dependent upon the movement of the displaced first robot arm or the displaced second robot arm.

6. The simulator workstation according to claim 1 wherein the plurality of different tools each comprise one or more connecting elements for connecting to the first connector at the distal end of the first robot arm or to the second connector at the distal end of the second robot arm.

7. The simulator workstation according to claim 6 wherein at least one of the plurality of different tools is configured to be connectable to one or to a plurality of the first connector and the second connector in use.

8. The simulator workstation according to claim 6 wherein at least one of the plurality of different tools comprises at least two portions which are displaceable with respect to each other and both of which are connectable to the first connector or to the second connector.

9. The simulator workstation according to claim 1 wherein each of the plurality of different tools comprises an electronic key that permits the controller to automatically sense which of the plurality of different tools is connected to the first connector or to the second connector.

10. The simulator workstation according to claim 9 wherein one or more procedures are associated with each of the plurality of different tools.

11. The simulator workstation according to claim 10 wherein one or more of the plurality of different tools comprises one or more sensors.

12. The simulator workstation according to claim 11 wherein one or more of the plurality of different tools comprises one or more haptic feedback means.

13. The simulator workstation according to claim 12 wherein one or more of the plurality of different tools comprises a memory unit.

14. The simulator workstation according to claim 13 wherein the memory unit stores parameters for the controller to use to simulate a procedure associated with the one or more of the plurality of different tools.

15. The simulator workstation according to claim 14 wherein the one or more sensors, the one or more haptic feedback means and/or the memory units are in electrical communication with the controller.

16. The simulator workstation according to claim 15 wherein the one or more sensors, the one or more haptic feedback means and/or the memory units are in electrical communication with the controller via a pathway of one or more electrical conductors extending from the controller, along a length of the first robot arm and the second robot arm and through an electrical connection made between the respective first connector and the second connector and the one or more of the plurality of different tools.

17. The simulator workstation according to claim 1 wherein the first connector and the second connector each comprise electrical connectors for transmitting power and/or data between the simulator workstation and a respective one of the plurality of different tools connected to the respective first connector and the second connector.

18. The simulator workstation according to claim 1 wherein at least one of the first connector and the second connector comprises a magnetic connector.

19. The simulator workstation according to claim 1 wherein the first robot arm and the second robot arm are controlled using an admittance control method wherein when a force is exerted upon the first robot arm or the second robot arm, the forced first robot arm or the forced second robot arm being displaced by the controller in a manner dependent upon a force applied.

20. The simulator workstation according to claim 1 wherein the first tool identifying means and the second tool identifying means each comprise an electronic or digital detecting element.

* * * * *